(No Model.)

W. SLOTE.
REEL.

No. 360,624. Patented Apr. 5, 1887.

WITNESSES:
C. Neveux
E. Sedgwick

INVENTOR:
W. Slote
BY Munn & Co.
ATTORNEYS.

United States Patent Office.

WILLIAM SLOTE, OF BROOKLYN, ASSIGNOR TO D. W. CLARK AND J. D. CLARK, OF NEW YORK, N. Y.

REEL.

SPECIFICATION forming part of Letters Patent No. 360,624, dated April 5, 1887.

Application filed January 22, 1887. Serial No. 225,102. (No model.)

*To all whom it may concern:*

Be it known that I, WILLIAM SLOTE, of the city of Brooklyn, in the county of Kings and State of New York, have invented a new and Improved Reel, of which the following is a full, clear, and exact description.

My invention has for its object to furnish for anglers' use an improved reel which is of exceedingly simple and cheap construction, while strong, serviceable, and efficient in action.

The invention consists in a novel construction of the reel-frame, as hereinafter clearly described and definitely claimed.

Reference is to be had to the accompanying drawings, forming a part of this specification, in which similar letters of reference indicate corresponding parts in all the figures.

Figure 1:
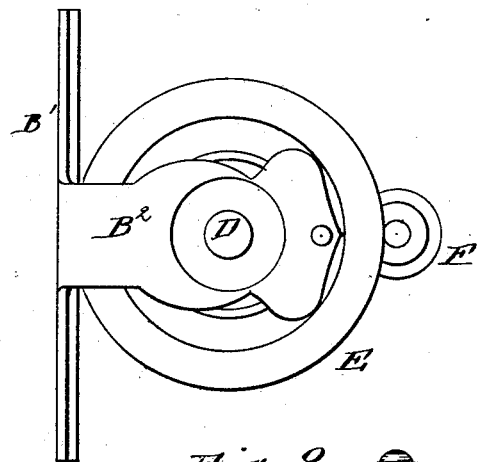
Figure 4:
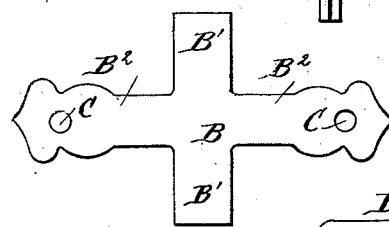
Figure 2:
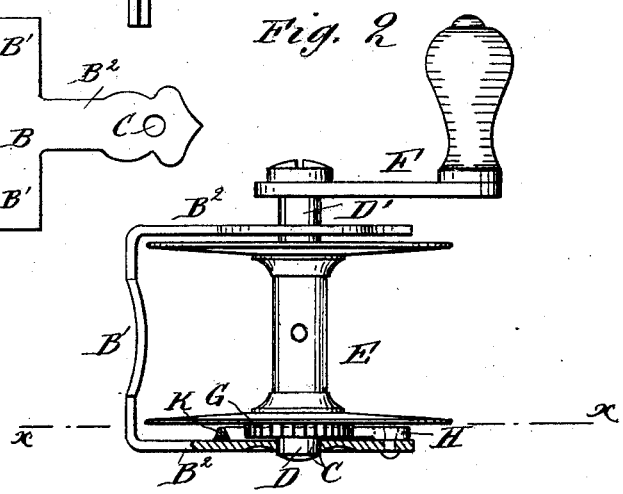
Figure 3:
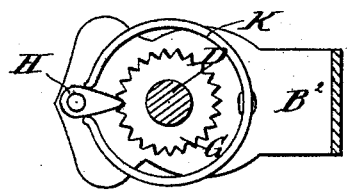

Figure 1 is a side view of my improved reel. Fig. 2 is a top view of the same, parts being broken away to reveal the construction. Fig. 3 is a sectional side view on the line $x\, x$, Fig. 2. Fig. 4 is a reduced plan of the blank from which the reel-frame is formed.

In constructing the frame of my improved reel I stamp or cut from metal plate—as brass—a blank, B, in nearly the form of a right-angled cross, as shown in Fig. 4, the upright strip B' of which, when stamped or pressed into concave form, constitutes the usual fastening-plate, by which the reel is attached to the handle of the fishing-pole by means of the ordinary sliding collars. The oppositely-projecting arms $B^2$ of the blank are formed with holes C near their outer ends, so that when bent parallel with each other and at right angles to the fastening-plate a short distance from the same, as shown, they form bearings for the end journals, D D', of the usual winding-spool, E.

The journal D' on one end of the spool projects through the hole C in the corresponding arm $B^2$, and carries the usual crank-handle, F, by which the spool is rotated. On the other journal, D, of the spool, between the disk-flange of the same and the corresponding bearing-arm $B^2$, is rigidly mounted a reverse ratchet-wheel, G, with which engages a radially-arranged pawl, H, pivoted at its outer end to the extremity of the arm $B^2$.

The pawl H is pressed on opposite sides by the free ends of a circular spring, K, soldered or secured at its middle point to the arm $B^2$, so that on turning the spool in either direction the pawl H acts as a click.

The devices forming the click are concealed between the spool-flange and bearing-arm.

With this construction the cost of manufacture is reduced to a minimum, while a very effective reel is obtained.

Having thus described my invention, what I claim as new, and desire to secure by Letters Patent, is—

The reel-frame formed entire from a single piece of metal plate, having the cross-piece B pressed into concave form, and the arms $B^2$ bent parallel with each other and formed with central holes, C, to form bearings for the spool-journals, substantially as shown and described.

WM. SLOTE.

Witnesses:
CLARENCE L. BURGER,
C. SEDGWICK.